(12) United States Patent
Schuster

(10) Patent No.: US 11,274,583 B1
(45) Date of Patent: Mar. 15, 2022

(54) INTERNAL COMBUSTION ENGINE EXHAUST MODIFICATION SYSTEM

(71) Applicant: Sonix Enterprises Inc., London (CA)

(72) Inventor: Fridolin Schuster, London (CA)

(73) Assignee: Sonix Enterprises Inc., London (CA)

( * ) Notice: Subject to any disclaimer, the term of this patent is extended or adjusted under 35 U.S.C. 154(b) by 0 days.

(21) Appl. No.: 17/088,696

(22) Filed: Nov. 4, 2020

Related U.S. Application Data

(60) Provisional application No. 62/930,624, filed on Nov. 5, 2019.

(51) Int. Cl.
  *F01N 3/00* (2006.01)
  *F01N 3/023* (2006.01)
  *F01N 13/00* (2010.01)

(52) U.S. Cl.
  CPC ......... *F01N 3/023* (2013.01); *F01N 13/0097* (2014.06); *F01N 2250/02* (2013.01)

(58) Field of Classification Search
  CPC ... F01N 3/023; F01N 13/0097; F01N 2250/02
  See application file for complete search history.

(56) References Cited

U.S. PATENT DOCUMENTS

| | | | |
|---|---|---|---|
| 3,393,668 A * | 7/1968 | Milgram | F01N 3/30 60/278 |
| 3,964,875 A * | 6/1976 | Chang | F01N 3/2892 422/176 |
| 5,083,435 A * | 1/1992 | Lin | F01N 3/005 60/280 |
| 5,135,551 A | 8/1992 | Fielding | |
| 5,417,727 A | 5/1995 | Bowen et al. | |
| 5,469,702 A | 11/1995 | Tuma et al. | |
| 5,916,134 A * | 6/1999 | Yang | F01N 3/2892 60/299 |
| 6,502,392 B1 | 1/2003 | Paas | |
| 7,240,483 B2 * | 7/2007 | Cizeron | F23G 7/07 60/286 |
| 7,584,748 B2 | 9/2009 | Freese, V | |
| 7,987,666 B2 | 8/2011 | Branning et al. | |
| 2004/0187456 A1 | 9/2004 | Bruck | |

(Continued)

FOREIGN PATENT DOCUMENTS

| | | |
|---|---|---|
| CN | 2043278 U | 8/1989 |
| CN | 202187811 U | 4/2012 |

(Continued)

*Primary Examiner* — Matthew T Largi

(57) ABSTRACT

An internal combustion engine exhaust modification system for transforming exhaust emissions from an internal combustion engine into modified exhaust emissions. The exhaust modification system include a housing extending between inlet and outlet ends thereof. The housing has a first cross-sectional area at a first location that is downstream from the inlet end and a second cross-sectional area at a second location that is downstream from the first location. The second cross-sectional area is larger than the first cross-sectional area. The system also includes an impeller rotatably mounted in the housing, and a filter subassembly. The filter subassembly removes part of particulate matter and liquid droplets in the exhaust emissions to transform the exhaust emissions into modified exhaust emissions.

8 Claims, 4 Drawing Sheets

(56) References Cited

U.S. PATENT DOCUMENTS

| | | | |
|---|---|---|---|
| 2006/0124384 A1 | 6/2006 | Tary et al. | |
| 2007/0144158 A1* | 6/2007 | Girard | F01N 3/2892 60/324 |
| 2009/0100826 A1* | 4/2009 | Stewart | F01N 3/32 60/295 |
| 2009/0235653 A1* | 9/2009 | Mital | F01N 3/106 60/311 |
| 2009/0301068 A1* | 12/2009 | Fujita | F01N 3/208 60/286 |
| 2010/0275587 A1* | 11/2010 | Schindler | F01P 5/06 60/311 |
| 2011/0173962 A1* | 7/2011 | Miwa | B01D 46/4218 60/311 |
| 2011/0239980 A1* | 10/2011 | Batzold | F01N 13/143 123/198 E |
| 2021/0087958 A1* | 3/2021 | Uehara | B01D 53/9477 |

FOREIGN PATENT DOCUMENTS

| | | |
|---|---|---|
| CN | 209892316 U | 1/2020 |
| ES | 170993 U | 12/1971 |
| JP | 2005054587 A | 3/2005 |
| JP | 2010242643 A * | 10/2010 |
| KR | 101699751 B1 | 1/2017 |
| KR | 101910435 B1 | 10/2018 |
| KR | 102072334 B1 | 1/2020 |

\* cited by examiner

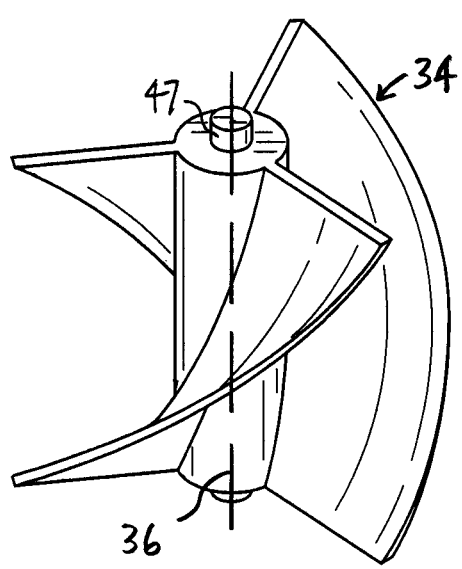
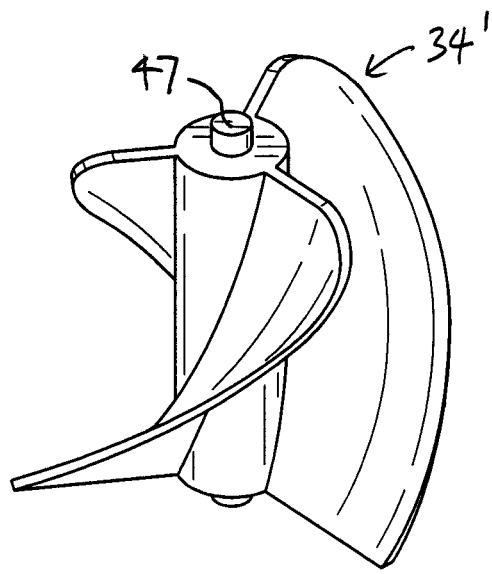
FIG. 2A  FIG. 2B
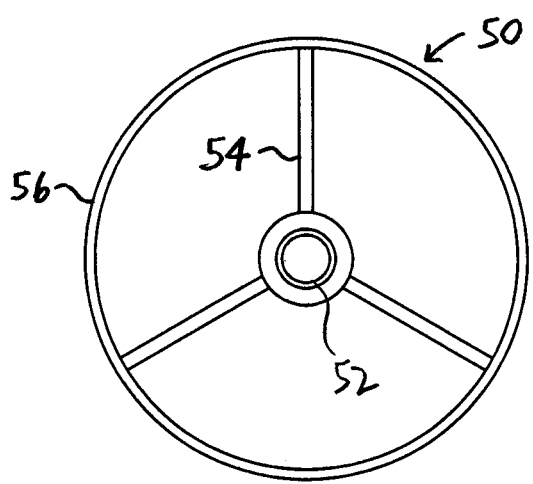
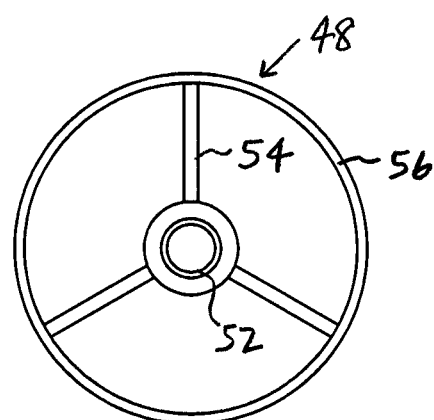
FIG. 3A  FIG. 3B

INTERNAL COMBUSTION ENGINE EXHAUST MODIFICATION SYSTEM

CROSS-REFERENCE TO RELATED APPLICATION

This application claims the benefit of U.S. Provisional Patent Application No. 62/930,624, filed on Nov. 5, 2019, the entirety of which is hereby incorporated by reference.

FIELD OF THE INVENTION

The present invention is an internal combustion engine exhaust modification system, for transforming exhaust emissions into modified exhaust emissions.

BACKGROUND OF THE INVENTION

As is well-known in the art, the exhaust produced by an internal combustion engine typically includes a variety of gases, particulate, and some fluids (e.g., droplets of motor oil and unburned fuel) that are directed into an exhaust system. In general, known exhaust systems do not prevent the gases and unconsumed fluids from exiting the exhaust systems.

SUMMARY OF THE INVENTION

For the foregoing reasons, there is a need for an internal combustion engine exhaust modification system that overcomes or mitigates one or more of the defects or disadvantages of the prior art.

In its broad aspect, the invention provides an internal combustion engine exhaust modification system, for transforming exhaust emissions from an internal combustion engine into modified exhaust emissions. The exhaust modification system includes a housing defined by a housing axis and extending between an inlet end, at which the exhaust emissions are received in the housing, and an outlet end, at which the modified exhaust emissions exit the housing. The housing has a first cross-sectional area therein at a first location that is downstream from the inlet end relative to the exhaust emissions received into the housing, and a second cross-sectional area at a second location that is downstream from the first location. The second cross-sectional area is larger than the first cross-sectional area. The system also includes an impeller rotatably mounted in the housing. The impeller is rotatable about an axis thereof that is coaxial with the housing axis, for accelerating particulate matter and liquid droplets in the exhaust emissions moving past the impeller outwardly from the axis. In addition, the system includes a filter subassembly positioned downstream relative to the impeller. The filter subassembly is configured to collect at least part of the particulate matter and the liquid droplets in the exhaust emissions, for removing the part of the particulate matter and the liquid droplets from the exhaust emissions to form the exhaust emissions into the modified exhaust emissions. The filter subassembly is permeable to the modified exhaust emissions.

In another of its aspects, the filter subassembly may be cooled, by directing cooler air over the filter elements. When the filter elements are at a temperature that is lower than the temperature of the exhaust emissions, more of the particulate matter and the liquid droplets in the exhaust emissions adhere to the filter elements. The cooler air may be provided, e.g., by an air conditioning unit mounted in the automobile.

BRIEF DESCRIPTION OF THE DRAWINGS

The invention will be better understood with reference to the attached drawings, in which:

FIG. 2A is an isometric view of an embodiment of an impeller of the invention, drawn at a larger scale;

FIG. 2B is an isometric view of another embodiment of the impeller of the invention;

FIG. 3A is a cross-section of the system of FIG. 1, taken along line B-B' in FIG. 1;

FIG. 3B is a cross-section of the system of FIG. 1, taken along line A-A' in FIG. 1;

DETAILED DESCRIPTION

Figure 1:
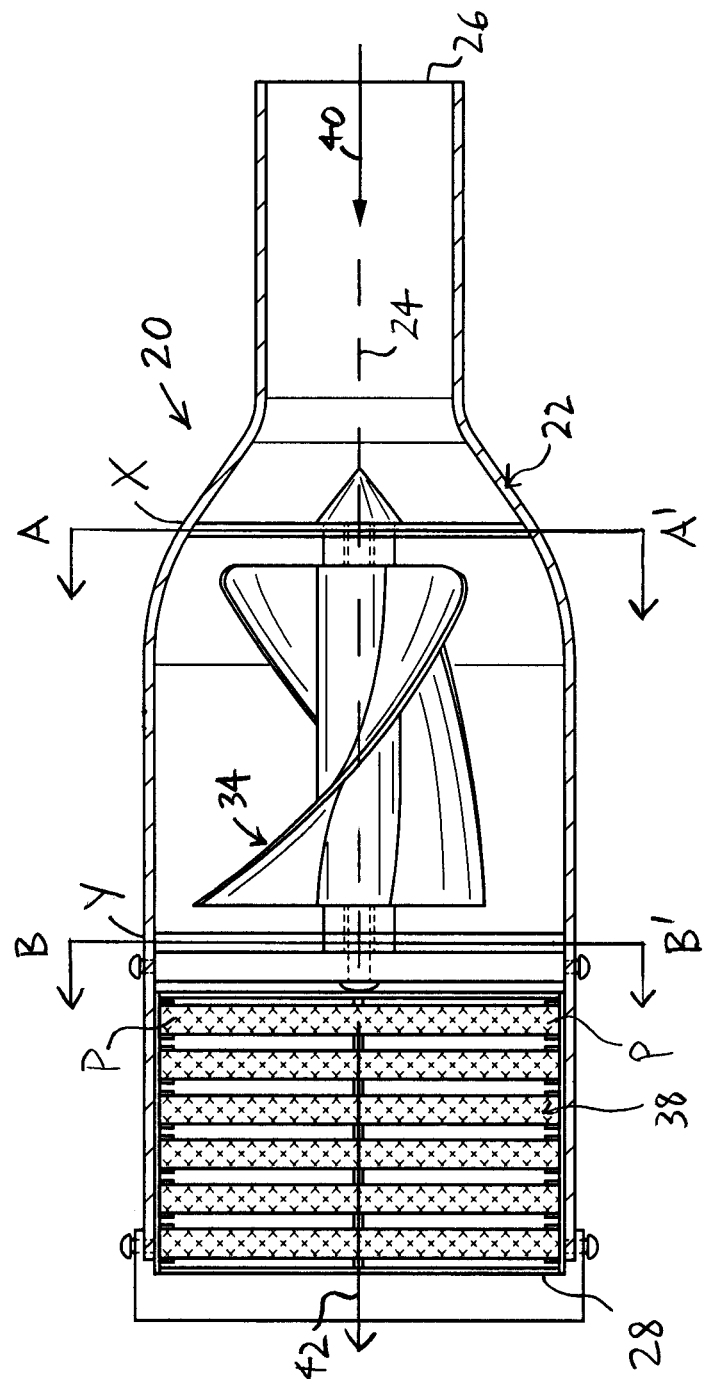
FIG. 1 is a longitudinal cross-section of an embodiment of an internal combustion engine exhaust modification system of the invention.

In the attached drawings, like reference numerals designate corresponding elements throughout. Reference is first made to FIGS. 1, 2A, and 3A-4B to describe an embodiment of an internal combustion engine exhaust modification system in accordance with the invention indicated generally by the numeral 20. As will be described, the internal combustion engine exhaust modification system 20 is for transforming exhaust emissions from an internal combustion engine into modified exhaust emissions.

In one embodiment, the exhaust modification system 20 includes a housing 22 defined by a housing axis 24 and extending between an inlet end 26, at which the exhaust emissions are received in the housing 22, and an outlet end 28, at which the modified exhaust emissions exit the housing 22 (FIG. 1). Preferably, the housing 22 has a first cross-sectional area therein at a first location "X" (FIG. 3B) that is downstream from the inlet end 26 relative to the exhaust emissions moving into the housing 22, and a second cross-sectional area at a second location "Y" (FIG. 3A) that is downstream from the first location "X", the second cross-sectional area being larger than the first cross-sectional area. The system 20 preferably also includes an impeller 34 rotatably mounted in the housing 22 (FIGS. 1, 2A).

The impeller 34 preferably is rotatable about an axis 36 (FIG. 2A) thereof that is coaxial with the housing axis 24, for accelerating particulate matter and liquid droplets in the exhaust emissions moving past the impeller outwardly from the axis 36. It is also preferred that the system 20 includes a filter subassembly 38 positioned downstream relative to the impeller 34 (FIG. 1). The filter subassembly 38 preferably is configured to collect at least part of the particulate matter and the liquid droplets in the exhaust emissions, for removing the part of the particulate matter and the liquid droplets from the exhaust emissions, to form the exhaust emissions into the modified exhaust emissions. As will also be described, the filter subassembly 38 preferably is permeable to the modified exhaust emissions.

In FIG. 1, arrow 40 represents the direction of the exhaust emissions flowing into the housing 22 at the inlet end 26, and arrow 42 represents the direction of the modified exhaust emissions exiting the housing 22 at the outlet end 28. It is preferred that, as the exhaust emissions flow through the housing 22, the exhaust emissions are formed into the modified exhaust emissions. Those skilled in the art would appreciate that the exhaust emissions include various gases (e.g., CO, and CO$_2$) as well as particulate matter and tiny liquid droplets, that may be present due to, among other things, incomplete combustion of the fuel in the internal combustion engine. The exhaust emissions are formed into the modified exhaust emissions by removal of at least part of the particulate matter and the liquid droplets from the exhaust emissions, as the exhaust omissions move through the housing 22.

As can be seen in FIG. 1, the impeller 34 preferably is located between the first and second locations "X", "Y". Those skilled in the art would also appreciate that the speed of the exhaust emissions at the second location "Y" is greater than the speed of the exhaust emissions at the first location "X", in accordance with Bernoulli's principle. In addition, the impeller 34 is designed to accelerate the particular matter and the liquid droplets outwardly from the impeller axis 36, which is coaxial with the housing axis 24. Accordingly, the exhaust emissions are accelerated in the direction indicated by arrows 40 and 42 due to the shape of the housing 22, and the exhaust emissions are at substantially the same time also centrifugally accelerated by the impeller 34. Because the particulate matter and the liquid droplets are included in the exhaust emissions, the particulate matter and the liquid droplets are also accelerated accordingly.

The filter subassembly 38 preferably is located downstream relative to the impeller 34. The filter subassembly 38 preferably is formed to catch the particulate matter and the liquid droplets that are accelerated radially away from the axis 36 of the impeller 34. However, once the particulate matter and the liquid droplets are substantially removed from the exhaust emissions, the balance remaining (referred to herein as the modified exhaust emissions) includes primarily gases, and may include only small amounts of particulate matter and the liquid droplets. The filter subassembly 38 preferably is also designed to be substantially permeable relative to the modified exhaust emissions.

The net result is that the particulate matter and the liquid droplets tend to accumulate in the peripheral region "P" of the filter subassembly 38 (FIG. 1), thereby removing at least part of the particulate matter and the liquid droplets from the exhaust emissions. As a result, the exhaust emissions become the modified exhaust emissions (i.e., due to the removal from the exhaust emissions of at least part of the particulate matter and the liquid droplets). Preferably, the modified exhaust emissions exit the housing 22 at the outlet end 28, flowing in the direction indicated by arrow 42.

Those skilled in the art would appreciate that the filter subassembly 38 may have any suitable form. Preferably, the filter subassembly 38 includes a support structure 44 for supporting a number of filter elements 46. Preferably, the individual filter elements 46 may be individually removed from time to time, for cleaning, and then returned to the support structure 44 thereafter. Alternatively, when necessary, the filter elements 46 may be replaced.

Figure 4B:
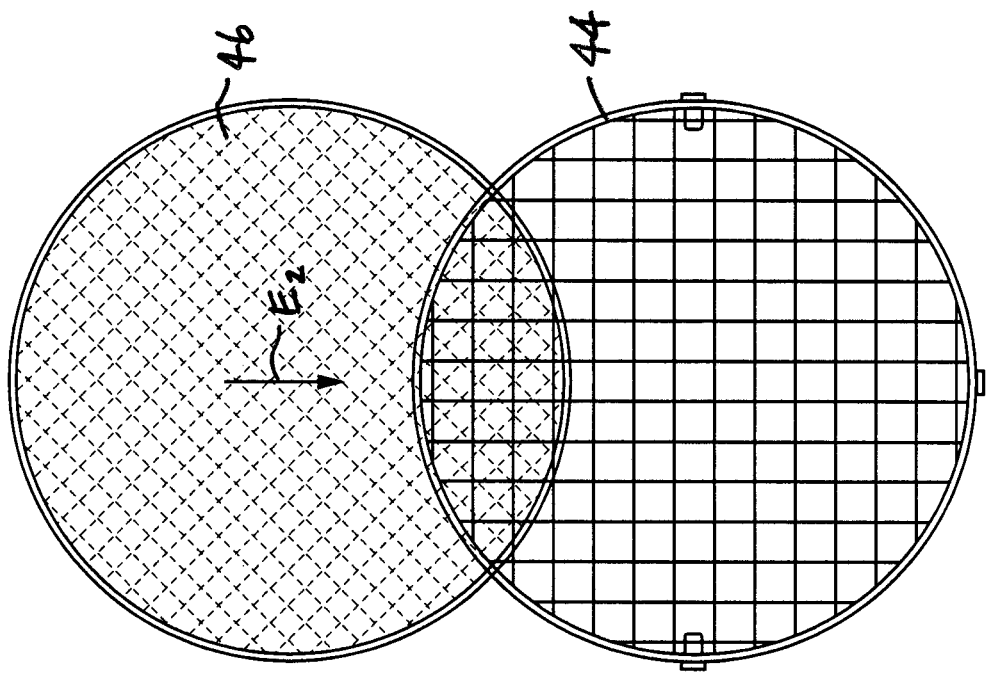
FIG. 4B is an end view of the filter subassembly of FIG. 5A.
Figure 4A:
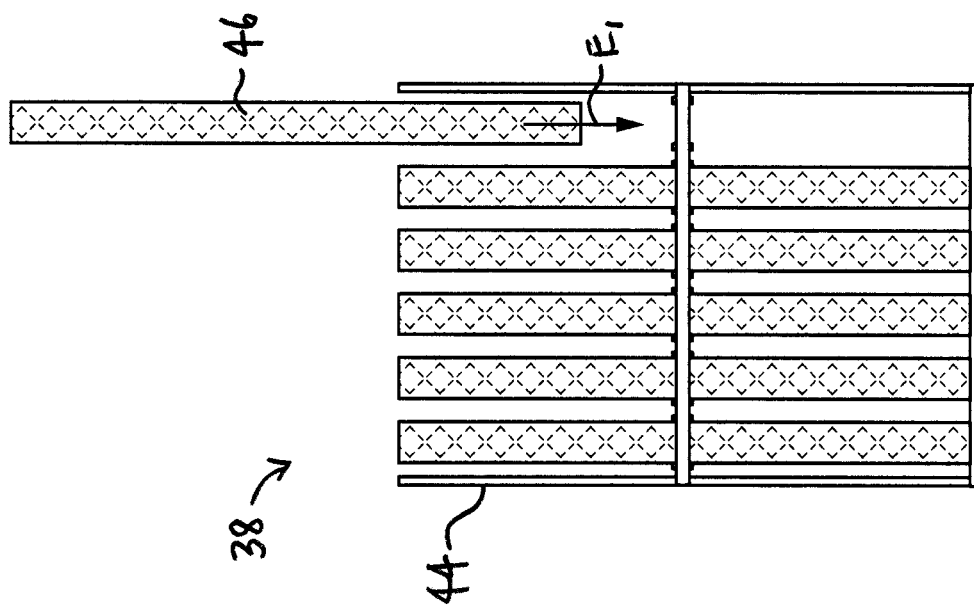
FIG. 4A is a side view of a filter subassembly of the invention, drawn at a larger scale.

The movement of the filter elements 46 into the support structure 44 is schematically indicated by arrows "E$_1$" and "E$_2$" in FIGS. 4A and 4B. It will be understood that the filter elements 46 preferably are movable out of the support structure 44 by moving the filter elements 46 in a direction opposite to the direction indicated by arrows "E$_1$" and "E$_2$".

It will also be understood that the impeller 34 may have any suitable shape. For exemplary purposes, an alternative embodiment of the impeller 34' is illustrated in FIG. 2B. As can be seen in FIGS. 2A and 2B, the impellers 34, 34' each include axles 47. Each axle 47 is aligned with the axis of the impeller respectively.

As can be seen in FIGS. 1, 3A, and 3B, the impeller 34 preferably is supported in the housing by impeller support assemblies 48, 50. Each of the impeller support assemblies 48, 50 preferably includes a bearing 52 in which the axle 47 is journalled. The bearing 52 preferably is held in position (i.e., coaxial with the housing axis 24) by a plurality of arms 54. In one embodiment, the arms 54 extend radially from the bearing 52 to a ring 56 that is formed to fit within the housing 22 at one of the predetermined locations, i.e., at "X" or at "Y". It will be understood that the rings 56 are secured inside the housing 22, at the locations "X" and "Y" respectively.

Those skilled in the art would appreciate that the exhaust system in which the exhaust modification system is included may also include other elements, e.g., a muffler and a catalytic converter (not shown). As is known in the art, where a conventional exhaust system is utilized, a certain amount of residue remains in the engine, as a result of combustion. However, it is believed that the system of the invention draws the residue out of the engine and into the exhaust modification system, to be caught in the filter subassembly therein.

Figure 5:
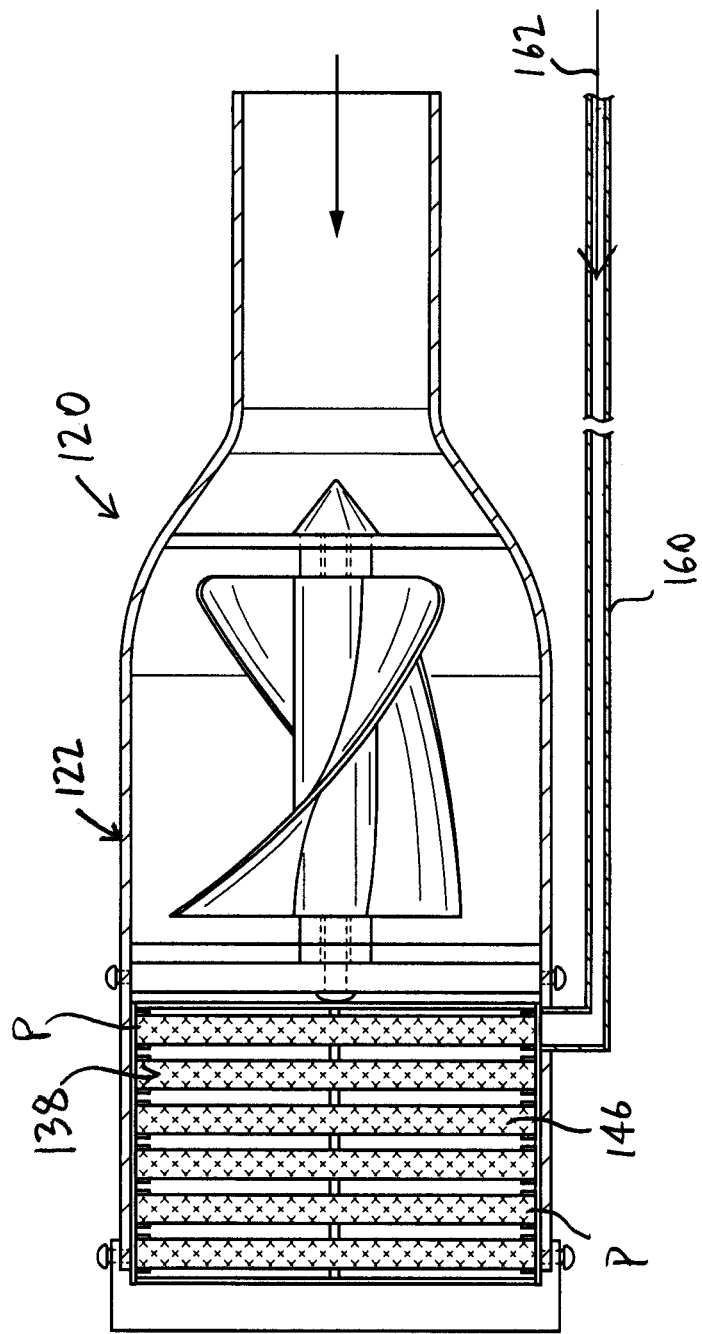
FIG. 5 is a longitudinal cross-section of an alternative embodiment of the internal combustion engine exhaust modification system of the invention, drawn at a smaller scale.

An alternative embodiment of the system 120 is illustrated in FIG. 5. Those skilled in the art would appreciate that, if the filter element is cooled to a temperature that is less than the temperature of the exhaust emissions, more of the particulate matter and the liquid droplets adhere to the filter 146, particularly in the peripheral region "P" of the filter element. Accordingly, the system 120 preferably includes a conduit 160 through which a volume of cooler air may be introduced into a housing 122, to cool one or more filter elements 146 in a filter subassembly 138 located in the housing 122.

The cool air is directed through the conduit 160 in the direction indicated by arrow 162. The cool air may be provided by any suitable source. For instance, in one embodiment, the cool air may be provided by an air conditioning unit (not shown) mounted in the automobile.

It will be appreciated by those skilled in the art that the invention can take many forms, and that such forms are within the scope of the invention as claimed. The scope of the claims should not be limited by the preferred embodiments set forth in the examples, but should be given the broadest interpretation consistent with the description as a whole.

I claim:

1. An internal combustion engine exhaust modification system, for transforming exhaust emissions from an internal combustion engine into modified exhaust emissions, the exhaust modification system comprising:

a housing defined by a housing axis and extending between an inlet end, at which the exhaust emissions are received in the housing via an inlet end opening that is coaxial with the housing axis, and an outlet end, at which the modified exhaust emissions exit the housing;

the housing having a first cross-sectional area therein at a first location that is downstream from the inlet end relative to the exhaust emissions received into the housing, and a second cross-sectional area at a second location that is downstream from the first location, the second cross-sectional area being larger than the first cross-sectional area, wherein the exhaust emissions at the first cross-sectional area flow faster relative to the housing than the exhaust emissions at the second cross-sectional area;

an impeller rotatably mounted in the housing, the impeller being rotatable by the exhaust emissions directed via the inlet opening into the housing about an axis of the impeller that is coaxial with the housing axis, for drawing the exhaust emissions out of the engine and for accelerating particulate matter and liquid droplets in the exhaust emissions outwardly from the axis;

a filter subassembly located in the housing and stationary relative to the housing, the filter subassembly being positioned downstream relative to the impeller, the filter subassembly being configured to collect at least part of the particulate matter and the liquid droplets in the exhaust emissions, for removing the at least part of the particulate matter and the liquid droplets from the exhaust emissions to form the exhaust emissions into the modified exhaust emissions, the filter subassembly being permeable to the modified exhaust emissions, wherein the impeller directs the at least part of the particulate matter and the liquid droplets to a peripheral region of the filter subassembly to accumulate in the peripheral region as the impeller is driven by the exhaust emissions moving past the impeller.

2. The internal combustion engine exhaust modification system according to claim 1 in which the filter subassembly comprises at least one filter element for filtering the exhaust emissions, and in which the at least one filter element is cooled to a temperature that is less that an emissions temperature of the exhaust emissions.

3. The internal combustion engine exhaust modification system according to claim 2 in which the filter element is cooled by cooler air directed to the at least one filter element via a conduit.

4. The internal combustion engine exhaust modification system according to claim 2 in which the impeller comprises an axle coaxial with the housing axis, the impeller being supported in the housing by a plurality of impeller support assemblies, each said impeller support assembly comprising:
- a bearing in which the axle of the impeller is rotatably mounted;
- a number of arms for locating the bearing coaxial with the housing axis; and
- a ring formed to fit within the housing at a predetermined location to position the impeller upstream relative to the filter subassembly.

5. The internal combustion engine exhaust modification system according to claim 2 in which the filter subassembly comprises a plurality of filter elements and a support structure for supporting the filter elements, each said filter element being removable from the support structure.

6. A method of removing particulate matter and liquid droplets from exhaust emissions from an internal combustion engine, the method comprising:
(a) providing a housing defined by a housing axis and extending between an inlet end, at which the exhaust emissions are received in the housing via an inlet end opening that is coaxial with the housing axis, and an outlet end, at which the modified exhaust emissions exit the housing;
(b) providing an impeller rotatably mounted in the housing, the impeller being rotatable by the exhaust emissions directed via the inlet opening into the housing about an axis of the impeller that is coaxial with the housing axis, for drawing the exhaust emissions out of the engine and for accelerating particulate matter and liquid droplets in the exhaust emissions outwardly from the axis;
(c) providing a filter subassembly located in the housing and stationary relative to the housing, the filter subassembly being positioned downstream relative to the impeller, the filter subassembly being configured to collect at least part of the particulate matter and the liquid droplets in the exhaust emissions, for removing the at least part of the particulate matter and the liquid droplets from the exhaust emissions to form the exhaust emissions into the modified exhaust emissions, the filter subassembly being permeable to the modified exhaust emissions; and
(d) directing the exhaust emissions into the inlet end opening, to rotate the impeller about the axis thereof, for accelerating the at least part of the particulate matter and liquid droplets in the exhaust emissions moving past the impeller outwardly from the axis, to accumulate the at least part of the particulate matter and liquid droplets with the filter subassembly in a peripheral region thereof.

7. The method according to claim 6 additionally comprising:
cooling the filter elements to a temperature that is less than a temperature of the exhaust emissions, for collecting the particulate matter and the liquid droplets on the filter elements.

8. The method according to claim 6 additionally comprising:
removing the filter elements;
cleaning the removed filter elements, to provide cleaned filter elements; and
positioning the cleaned filter elements in the support subassembly.

* * * * *